(12) United States Patent
Kim et al.

(10) Patent No.: US 8,478,292 B2
(45) Date of Patent: Jul. 2, 2013

(54) WIRELESS LOCALIZATION METHOD BASED ON AN EFFICIENT MULTILATERATION ALGORITHM OVER A WIRELESS SENSOR NETWORK AND A RECORDING MEDIUM IN WHICH A PROGRAM FOR THE METHOD IS RECORDED

(75) Inventors: Seong Cheol Kim, Seoul (KR); Jung Kyu Lee, Seoul (KR)

(73) Assignee: Snu R&DB Foundation, Seoul (KR)

( * ) Notice: Subject to any disclaimer, the term of this patent is extended or adjusted under 35 U.S.C. 154(b) by 29 days.

(21) Appl. No.: 13/337,653

(22) Filed: Dec. 27, 2011

(65) Prior Publication Data

US 2013/0045750 A1 Feb. 21, 2013

(30) Foreign Application Priority Data

Aug. 19, 2011 (KR) .................. 10-2011-0082840

(51) Int. Cl.
*H04W 24/00* (2009.01)

(52) U.S. Cl.
USPC ............. 455/456.1; 455/414.1; 342/451

(58) Field of Classification Search
USPC .. 455/404.1–404.2, 414.1–414.4, 456.1–457; 370/252, 328–338; 342/450–465
See application file for complete search history.

(56) References Cited

U.S. PATENT DOCUMENTS

| 7,205,938 | B2* | 4/2007 | Davi et al. ................ | 342/451 |
| 8,248,963 | B2* | 8/2012 | Kim et al. ................ | 370/252 |
| 2010/0246419 | A1* | 9/2010 | Batta et al. ................ | 370/252 |
| 2010/0248668 | A1* | 9/2010 | Katayama et al. ......... | 455/226.1 |
| 2011/0304503 | A1* | 12/2011 | Chintalapudi et al. ... | 342/357.29 |
| 2012/0244875 | A1* | 9/2012 | Cardona et al. ........... | 455/456.1 |

OTHER PUBLICATIONS

Paula Tarrio et al.—A New Positioning Technique for RSS-Based Localization Based on a Weighted Least Squares Estimator; IEEE ISWCS 2008; pp. 633-637.
Francesco Sottile et al.—Design, Deployment and Performance of a Complete Real-time ZigBee Localization System; 2008 IEEE.
Andreas F. Molisch et al.—IEEE 802.15.4a Channel Model—Final Report, Year Published: 2004.
Neal Patwari et al.—Locating the Nodes—Cooperative Localization in Wireless Sensor Networks; IEEE Signal Processing Magazine, Jul. 2005, pp. 54-69.
Hui Liu et al.—Survey of Wireless Indoor Positioning echniques and Systems; IEEE Transactions on Systems, Man, and Cybernetics—Part C: Applications and Reviews, vol. 37, No. 6, Nov. 2007; pp. 1067-1080.

* cited by examiner

*Primary Examiner* — Kashif Siddiqui
(74) *Attorney, Agent, or Firm* — Roberts Mlotkowski Safran & Cole P.C.

(57) ABSTRACT

A wireless localization technology using efficient multilateration in a wireless sensor network is disclosed. After calculating estimated distances from each of at least three reference nodes to a blind node using received signal strength of wireless signals that the at least three reference nodes received from the blind node, the estimated location of the blind node is obtained through multilateration using the calculated estimated distances. To correct error in the estimated location, the estimated distances are used, and the error correction direction and error correction distance for the estimated location are calculated by applying a largest weight to the reference node closest to the estimated location. The error of the estimated location is corrected by move the estimated location of the blind node by the calculated error correction direction and error correction distance. Calculation for the error correction is very simple and fast.

12 Claims, 6 Drawing Sheets

○ Coordinator
○ Router
o terminal (a)

EP : Estimated location of blind node
AN1~AN3 : Reference node
$C_1, C_2, C_3$ : Circle with estimated distance ($dist_i$) of each reference node as radius (b)

EP : Estimated location of blind node
AN1~AN3 : Reference node (c)

EP : Estimated location of blind node
MEP : Corrected estimated location of blind node
RP : real location of blind node
AN1~AN3 : Reference node

WIRELESS LOCALIZATION METHOD BASED ON AN EFFICIENT MULTILATERATION ALGORITHM OVER A WIRELESS SENSOR NETWORK AND A RECORDING MEDIUM IN WHICH A PROGRAM FOR THE METHOD IS RECORDED

BACKGROUND OF THE INVENTION

1. Field of the Invention

The present invention relates to a wireless localization method based on a wireless sensor network, more specifically to a wireless localization method, which is able to correct localization error precisely in real time in a wireless localization through multilateration algorithm using received signal strength indicator (RSSI). Here, the term 'multilateration' is a concept including trilateralism and indicates a method for estimating an estimated location of a blind node using more than three reference nodes.

2. Background Art

As the interest on smart phones increases explosively, a location based service (LBS) receives spotlight, and for example, location-recognizing applications such as augmented reality, medical care, home network, monitoring applications, etc. are popular. For such a LBS, a localization on location of user requesting the service must be achieved precisely.

A well-known localization system includes a global positioning system (GPS) with applications used as mobile navigation. However, the GPS provides a high performance in an outdoor environment, but since the location information is obtained using satellites there is a limit in that it is hard to achieve a precise localization indoors. Therefore, the GPS is not suitable for a localization system in indoor channel environments or with low-cost devices.

For such reasons, for indoor wireless localization, technologies such as wireless local area network (WLAN), ultra wide band (UWB) communication, and wireless sensor network (WSN) have been suggested and many researches have been performed. The WLAN or UWB system has various limits to cost, battery, size of system device, etc. On the contrary, the WSN is a method which provides many sensor nodes of small size and uses them for localization, and has advantages such as low cost, easy installation, small size, and possibility of connecting numerous nodes. The indoor environment has many obstacles such as wall, door, pillar, etc, and especially when there are objects of metal, the strength of received signal shows a very large difference according to whether it is an environment of line-of-sight (LOS) or non-line-of-sight (NLOS). The WSN can make such environmental factors optimal by forming tree topology network. Since it can connect many nodes, it is possible to form a network avoiding walls between rooms. Due to such features, the WSN is estimated as a very useful system in indoor channel environment. Zigbee technology is a close-range wireless communication technology of low cost, low power-consumption, and low speed based on IEEE 802.15.4. Since the node device applied with the Zigbee technology may have a very simple hardware structure and can be connected to many other nodes in a network, it is possible to form a WSN of very low cost effectively using them.

On the other hand, well-known representative wireless localization methods include a range free approach and a range based approach. A method for estimating a location without information on the distance between transmitter side and receiver side in estimating the location of a user is the range free approach, but since the method requires a high cost and has to store enormous amount of information, its real feasibility is low. On the contrary, the range based approach is a method for estimating location based on information on distance between transmitter side and receiver side, and includes trilateration estimation, least square estimation (LSE), weight least square estimation (WLSE), etc.

A representative method for estimating the distance between transmitter side and receiver side, which is used in the range based approach, is a method using RSSI. The RSSI method uses a model of path-loss of signal for estimating the distance between transmitter side and receiver side using strength of signal received at the receiver side only. This method is simple because it does not use a complicated method such as synchronization of the transmitter side and receiver side, but the property of the signal makes the accuracy decreased in a region where NLOS is formed. However, in case of using a low-cost node such as Zigbee, if making a network by positioning many sensor nodes in a narrow region, it is possible to make an environment where each node forms a LOS. If making a network of tree topology as in FIG. 1 using such environmental factors, it is possible to make an environment optimal for estimating location using the RSSI indoors.

The trilateration is widely used as a basic method for estimating location of user using the distance between transmitter side and receiver side which is estimated by a method using RSSI. For a precise localization using trilateration, it is necessary to set a center on a node ('reference node') the location of which is known, such that three circles with distances estimated by RSSI as radii form cross lines and such cross lines form a single cross point (see FIG. 2). However, if there is a large error in estimating the distance between transmitter side and receiver side, the distance is estimated too large or too small, such that one circle may be separated from the other circle(s) or one circle may include the other circle(s) completely, that is, an occasion that the three circles are not able to form cross lines (see FIG. 3) may occur in real situation. When one circle is separated completely from the other circle(s) or includes the other circle(s) completely, the estimation error gets relatively larger than otherwise. Therefore, the trilateration based on RSSI needs to seek a method for improving such a localization error fundamentally.

In order to correct the localization error in prior arts, prior to calculating estimated location using trilateration, correcting of error in estimated distance obtained using RSSI was performed first, and then the estimated location was obtained with trilateration using the error-corrected estimated distance. Since the estimated distance used in trilateration was error-corrected, another error-correction to the estimated distance obtained in trilateration was not performed further, and it was determined as a final estimated location to be obtained. However, since such conventional wireless localization method based on error-correction of estimated distance has an algorithm of complicated and recursive calculations and the amount of calculations increases further to increase accuracy of localization, it is not suitable to the real-time wireless localization service.

Since the wireless localization approach according to the conventional WLSE determines a correction using as channel factors such as channel exponent and a size of log-normal shadowing, there is a limit to it. For it is very hard to know precisely two channel factors. Therefore, it does not become a practical method.

SUMMARY OF THE INVENTION

1. Object of the Invention

It is an object of the present invention to provide a wireless localization method and a recordable medium recording program for executing the same, which corrects localization error of estimated location precisely in real-time through simple calculations using estimated distances between a blind node and reference nodes in estimating location of the blind node through multilateration using RSSI, and therefore can be applied to a real-time wireless localization service.

2. Solution of the Invention

According to an aspect of the present invention for achieving the above objects, a wireless localization method performed by a wireless localization server in a wireless network including at least three reference nodes locations of which are known, a blind node location of which is to be found, and the wireless localization server comprises: a first step for, in the wireless localization server, being supplied with received signal strengths (RSS) of received wireless signal that the three reference nodes receive from the at least three reference nodes and calculating at least three estimated distance from each of the at least three reference nodes to the blind node; a second step for, in the wireless localization server, calculating estimated location of the blind node with multilateration using the calculated at least three estimated distances; a third step for, in the wireless localization server, calculating error-correction direction and error-correction distance of the estimated location with a reference node closest to the estimated location as a center using the estimated distances calculated in the first step, in order to correct error in the calculated estimated location; and a fourth step for, in the wireless localization server, calculating a corrected estimated location with the estimated location of the blind node calculated in the second step moved in the error-correction direction and by the error-correction distance calculated in the third step.

In the wireless localization method, the error-correction direction in the third step is preferably calculated by performing a third-1 step for calculating a first angle vector $\tilde{\theta}_c$ pointing from the estimated location calculated in the second step to the closest reference node and a second angle vector $\tilde{\theta}_f$ pointing to the farthest reference node; and a third-2 step for obtaining an error-correction direction (angle) $Comp_A$ using the following formula (where the weights $\alpha$ and $\beta$ are values determined by the following formula, and $dist_c$ and $dist_f$ stand for estimated distances from the closest reference node and the farthest reference node respectively).

$$Comp_A = \frac{\alpha \times \tilde{\theta}_f + \beta \times \tilde{\theta}_c}{|\alpha \times \tilde{\theta}_f + \beta \times \tilde{\theta}_c|} \quad \alpha = \frac{dist_f}{dist_f + dist_c} \quad \beta = \frac{dist_c}{dist_f + dist_c},$$

$$0 \le \alpha, \beta \le 1$$

Here, the weights $\alpha$ and $\beta$ preferably have value 1 respectively.

In the wireless localization method, the error-correction distance in the third step is preferably calculated by performing a third-3 step for calculating an estimated distance $dist_i$ of a reference node closest to the estimated location and a distance $dist_{iep}$ from the estimated location to the closest reference node; and a third-4 step for calculating error-correction distance $Comp_D$ using the following formula (a weight $\gamma$ is a value determined by Cramer-Rao lower bound (CRLB) from a reference node closest to the estimated location, i specifies the reference nodes, and $CRLB_i$ is a minimum variance of the distance of the reference node(i) to estimate).

$$Comp_D = \gamma \times dist_i - dist_{iep}, -CRLB_i \le \gamma \le CRLB_i$$

Here, the weight $\gamma$ is preferably 1.

In the wireless localization method, the second step preferably comprises a step for calculating the estimated location of the blind node using trilateration using three estimated distances.

The wireless localization method preferably further comprises, prior to the second step, a fifth step, when there exists an error larger than a threshold in the three estimated distances calculated in the first step, for performing error-correction with respect to the estimated distances containing the error.

Preferably, the fifth step comprises a fifth-1 step for obtaining at least three estimated distance circles with the at least three estimated distances, corresponding to the at least three reference nodes, as radii and with the at least three reference nodes as a center, respectively; and a fifth-2 step for, when the estimated distance circle with the largest range among the at least three estimated distance circles includes the other two estimated distance circles and cannot form a cross point with them, reducing the estimated distance of the estimated distance circle with the largest range for error-correction such that the estimated distance circle with the largest range touches the estimated distance circle with a smallest range.

On the other hand, according to another aspect of the present invention, a recording medium storing a wireless localization program and that is readable by a wireless localization server in a wireless network including at least three reference nodes locations of which are known, a blind node location of which is to be found, and the wireless localization server comprises: a first function of, in the wireless localization server, being supplied with RSS of received wireless signal that the three reference nodes receive from the at least three reference nodes and calculating at least three estimated distance from each of the at least three reference nodes to the blind node; a second function of, in the wireless localization server, calculating estimated location of the blind node with multilateration using the calculated at least three estimated distances; a third function of, in the wireless localization server, calculating error-correction direction and error-correction distance of the estimated location with a reference node closest to the estimated location as a center using the estimated distances calculated in the first function, in order to correct error in the calculated estimated location; and a fourth function of, in the wireless localization server, calculating a corrected estimated location with the estimated location of the blind node calculated in the second function moved in the error-correction direction and by the error-correction distance calculated in the third function.

3. Advantageous Effects of Invention

According to the present invention, in a wireless localization using multilateration, the accuracy of estimated location of blind node can be improved much by finding out an estimated distance including relatively large estimation error and then reducing the error in the estimated distance.

In the conventional WLSE's estimation algorithm, a weight could be applied only if knowing a random factor and a channel exponent precisely and calculations must be repeated for error correction of estimated location. In contrast, idea of the present invention is simple due to a few operations but powerful algorithm, which makes it easy to implement. Since the present invention enables correction of location just by comparing estimated distances from each reference node to blind node, the calculation for location estimation is very simple and can be performed effectively. Therefore, the wireless localization method according to the present invention can be a very efficient method for real-time positioning or locating.

The present invention provides better accuracy in localization also with all numbers of nodes. Especially, drastic improvement can be obtained than conventional methods when using the fewest three nodes.

DESCRIPTION OF THE PREFERRED EMBODIMENTS

Figure 1:
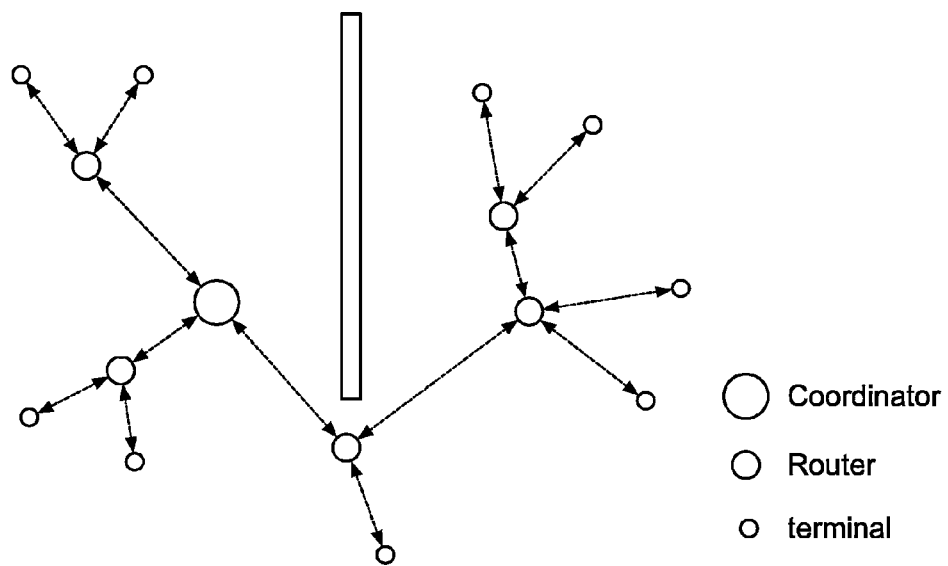
FIG. 1 is a tree diagram showing a network for explaining an optimal environment for estimating location using RSSI.

Referring to the figures, embodiments of the present invention are described in detail below.

The wireless localization method according to the present invention measures distances from blind node to each reference node using RSS, and estimates the location of the blind node through trilateration using the estimated distance values.

(1) Indoor Path-Loss Model

RSS can be measured with respect to each of packets which the reference nodes received from the blind node. It is well known that the strength of the transmitted signal decreases proportional to the distance between the transmitting side and the receiving side. Due to the random property of shadowing, it has a specific average value and follows a Gaussian distribution with the average value as a center (when the distance between the transmitting side and the receiving side is constant). When using Gaussian model, the strength $\overline{P_{ij}}$ (average value of RSS ensemble) of signal which the i-th reference node (receiving side) received from the j-th blind node (transmitting side) is modeled as Eq. (1-1) when the distance between the transmitting side (blind node) and the receiving side (reference node), that is, the estimation distance to obtain is $d_{ij}$.

$$\overline{P_{ij}} = P_0 - 10 \times n \times \log_{10}\left(\frac{d_{ij}}{d_0}\right) + X_{\sigma_{ij}} \quad (1\text{-}1)$$

Here, $P_0$ means the received power (dBm), that is, signal strength received at a short reference distance $d_0$ (usually 1 m), n means path-loss exponent changing according to environment having 2~4 in general, and $X_{\sigma_{ij}}$ stands for log-normal shadowing value between the node i and the node j, expressed in a unit of dB, and is related to the distance error. The distance needed for estimating the location using the strength of received signal based on the above value is given by Eq. (1-2).

$$\hat{d}_{ij} = 10^{-(P_{ij}-P_0)/(10 \times n)} \quad (1\text{-}2)$$

There are three major reasons for error in estimating distance using the RSSI as in the above.

They are hardware-related error, limit of distance-estimation algorithm, and environmental factor.

The hardware-related error is known to be about 3 dB~4 dB in a general ZigBee device. In a real channel, multi-path signal fading (signals passing various paths have different magnitudes and phases and interfere constructively or destructively in a given frequency, generating error) and shadowing (error occurs in the received signal due to environmental factor) are two environmental factors generating RSS error. As the multi-path signal fading causes frequency-selective fading, such a fading effect can be reduced using spread spectrum. Because WSN's frequency-selective effect can use direct sequence spread spectrum, the frequency-selective effects can be thought to be reduced. Therefore, we can assume that the environmental errors are caused mainly by shadowing effects by wall, tree, chair, etc. In estimating distance using RSS in a wireless localization, the effects of multi-path fading can be ignored and only the effect of shadowing may be considered. The shadowing effects by obstacles may be modeled as a random process. Since the RSSI (dBm) in the above equation is a measured value using the RSS, the power loss $P_0$ at 1 m and the path loss exponent n should be verified through experimental measurement. This is a process to be done in advance in order to estimate the precise distance from the RSS.

(2) Trilateration

The trilateration is a method for estimating location based on estimated locations, which uses three fixed nodes (reference nodes) locations of which are known and estimates the location of a node (blind node) location of which is to be found. It is supposed that each of all the nodes has omni-directional antenna for the sake of cost, and each of the fixed nodes can estimate the distance $\hat{d}$ between the blind node and itself using the path-loss model. Due to log-normal shadowing, the RSS following the path-loss model is distorted. The log-normal shading effect is considered accordingly, but the difference between real signal strength and the RSS following the path-loss model cannot be known. Because of this, the log-normal shadowing effect causes localization error to some extent.

As for the RSS expressed as a RSSI with log-normal shadowing, the estimated distance $\hat{d}$ is not accurate. Each node has an independent log-normal shadowing. Hence, the estimated distance $\hat{d}$ has different random variables. In order to calculate the location using trilateration, three equations for circular lines pertaining to the location should be estimated.

$$(x_1-x)^2+(y_1-y)^2=\hat{d}_2^2$$

$$(x_2-x)^2+(y_2-y)^2=\hat{d}_2^2$$

$$(x_2-x)^2+(y_2-y)^2=\hat{d}_2^2 \quad (2)$$

Here, $x_i$ and $y_i$ (i=1, 2, and 3) are the Cartesian coordinate points of the reference node, x and y stand for the estimated point of the blind node in the same coordinate system, and $\hat{d}_i$ (i=1, 2, and 3) represents the estimated distance between the reference node and the blind node.

The estimated location of the blind node can be obtained by performing the following calculations using Eq. (2). Eq. (2) are equations for three circles obtained by using three locations (center of circle) of reference nodes and three estimated distances $\hat{d}_i$ (i=1, 2, and 3) (radius). Subtracting the second equation and the first equation from the third equation of Eq. (2), the following two line equations are obtained.

$$(x_1 - x_3)x + (y_1 - y_3)y = \frac{1}{2}\left[(\hat{r}_3^2 - \hat{r}_1^2) - (x_3^2 - x_1^2) - (y_3^2 - y_1^2)\right] \quad (2.1)$$

$$(x_1 - x_3)x + (y_1 - y_3)y = \frac{1}{2}\left[(\hat{r}_3^2 - \hat{r}_1^2) - (x_3^2 - x_1^2) - (y_3^2 - y_1^2)\right]$$

Solving the two line equations together, the solution becomes the estimated location of the blind node.

More specifically, the above equations (2.1) give the following form in matrix.

$$Hx = b \quad (2.2)$$

Here, $$H = \begin{bmatrix} (x_1 - x_3) & (y_1 - y_3) \\ (x_2 - x_3) & (y_2 - y_3) \end{bmatrix}, x = \begin{bmatrix} x \\ y \end{bmatrix}, \text{ and}$$

$$b = \frac{1}{2}\begin{bmatrix} (\hat{r}_3^2 - \hat{r}_1^2) - (x_3^2 - x_1^2) - (y_3^2 - y_1^2) \\ (\hat{r}_3^2 - \hat{r}_2^2) - (x_3^2 - x_2^2) - (y_3^2 - y_2^2) \end{bmatrix}.$$

Solving this using inverse matrix, the location of blind node can be found as follows.

$$\hat{x} = H^{-1}b \quad (2.3)$$

As a result, the location of the blind node is estimated using the least square method.

Figure 2:
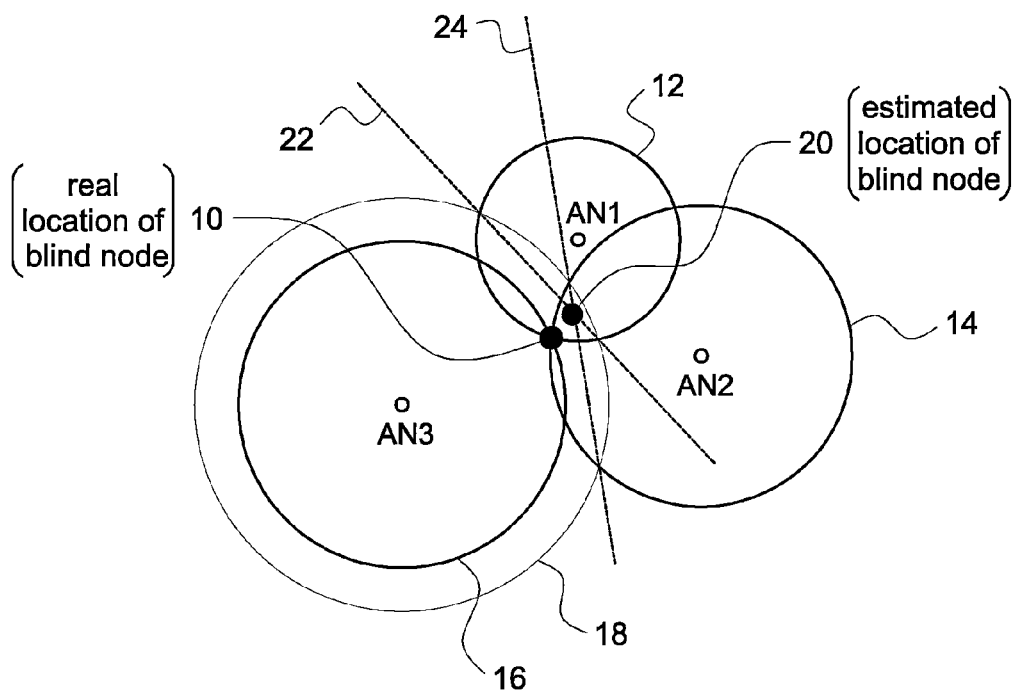
FIG. 2 is a diagram showing an example of intersection case of trilateration.
Figure 3:
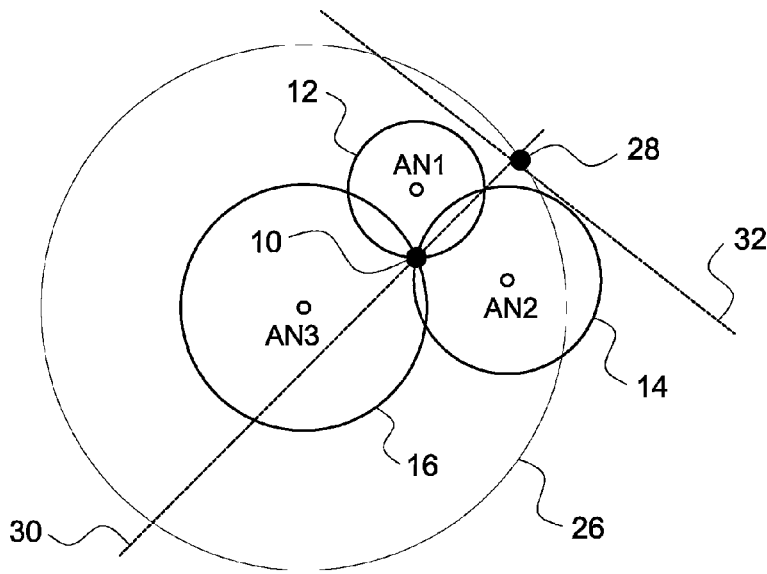
FIG. 3 is a diagram showing an example of none intersection case of trilateration.

Trilateration can be described geometrically as follows. If distances between three reference nodes (AN1, AN2, AN3) and the blind node are estimated accurately, as in FIG. 2, the three circles (12, 14, 16) meet one another at a point (10). In this case that the three circles met one another at a point, the very precise location estimation is made with accurate measurement of distance. However, if an error is included in the estimated distance between the reference nodes and the blind node, the three circles do not meet at a point. For example, when the estimated distance from the reference node AN3 to the blind node is not accurate, a circle like the dashed line (18) may be formed. In such a case, according to conventional trilateration, as shown in the figure, the cross point or intersecting point (20) of two lines (22, 24) formed by the two circles (12, 18) and another two circles (14, 18) becomes the estimated location. If the distance was estimated such that two circles do not intersect (that is, estimated such that the circle (12) is utterly included in another circle (26)), an equation of one line (32) is obtained by solving equations of the two circles. Then as shown in FIG. 3, the intersecting point between the line (32) and a line (30) connecting two intersecting points of the other two circles (12, 14) becomes the estimated location.

A wireless localization method of the present invention below uses at least three reference nodes to obtain the estimated distance to the blind node. The estimated distance from each reference node to the blind node is obtained by trilateration in case of using three reference nodes and by multilateration in case of using four or more reference nodes. The multilateration is an extension of the trilateration and obtains the estimated distance of each reference node using least square method, and it is same in calculating the estimated location of blind node using least square method with the obtained estimated distances, which is omitted since it is well known.

(3) Wireless Localization Method with Efficient Error-Correction

Figure 6:
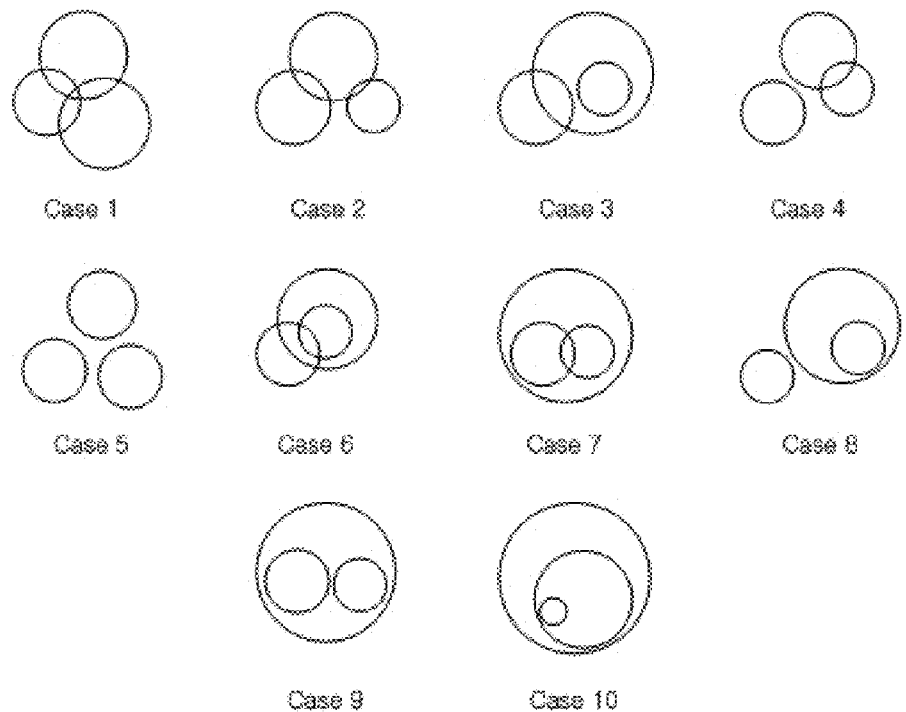
FIG. 6 is a diagram showing an example of trilateration in all possible cases.

In estimating the location of blind node, reasons for the errors are addressed. The localization error of blind node is made by environmental factors as described in the above. In the power dimension, RSS is affected by the shadowing factor. Accordingly, RSSI has noisy ranges of measurements which cancel any intersecting point of the three estimated circles using trilateration. FIG. 6 plots an example of trilateration for all occasions.

The localization error of Case 1 is lower than the other cases. It is because all the estimated distances have less variance. This is defined by the CRLB, represented by Eq. (3) below. The signal strength is of dB scale, represented as an exponential function if changed to distance, and this is so because the shadowing factor follows log-normal distribution. Thus, if estimating distance through signal strength, this also is changed to a probability model and the probabilistic distribution, that is, the variance of the estimated distances can be defined by CRLB. The CRLB sets a lower bound of the variance of an unbiased estimator.

$$\text{Var}(\hat{d}) \geq \frac{1}{I(d)} \quad (3)$$

Here, $\hat{d}$ is an estimated distance using the signal strength, and thus $\text{Var}(\hat{d})$ means a variance of it. I(d) is a Fisher information matrix (FIM) which is defined as follows.

$$I(d) = -E\left[\frac{\partial^2 \ln p(RSS; d)}{\partial d^2}\right] \quad (4)$$

p(RSS;d) is a probability density function of RSS with d as a parameter, and is defined as follows.

$$p(RSS; d) = \frac{1}{\sqrt{2\pi}X_\sigma}\exp\left(-\frac{(RSS - 10 \times n \times \log_{10}d)^2}{2 \times X_\sigma^2}\right) \quad (5)$$

Thus, the variance of lower bound of the estimated distance can be calculated as follows.

$$\text{Var}(\hat{d}) \geq \frac{1}{I(d)} = \left(\frac{\ln 10}{10} \times \frac{X_\sigma}{n}\right)^2 \times d^2 \quad (6)$$

Figure 7:
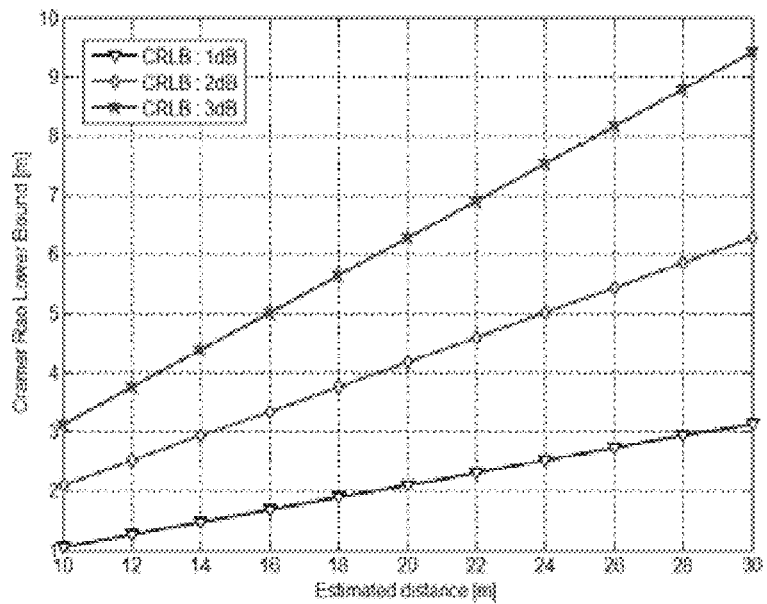
FIG. 7 is a graph showing CRLB determined according to estimated distance and shadowing factor.

Var ($\hat{d}$) of Eq. (6) indicates CRLB, and CRLB means a minimum variance of distances from reference nodes to be estimated. According to Eq. (6), the standard variance of the estimated distance (d) changes according to estimated distance d, log-normal shadowing factor $X\sigma$, and channel exponent n. This is checked in the graph of FIG. 7 showing that CRLB is determined by estimated distance d, log-normal shadowing factor Xσ, and channel exponent n.

However, the shadowing factor will be similar among all of reference nodes when the reference nodes are in a similar plane. The reference node that has the farthest estimated distance leads to low performance. On the contrary, the reference node that has the shortest estimated distance is the most reliable node among all the other reference nodes. Therefore, in order to make an error correction method and mitigates the geometrical problems as in FIG. 6, it is preferable to consider two reference nodes, that is, the reference node having the shortest estimated distance and the reference node having the farthest estimated distance.

Figure 4:
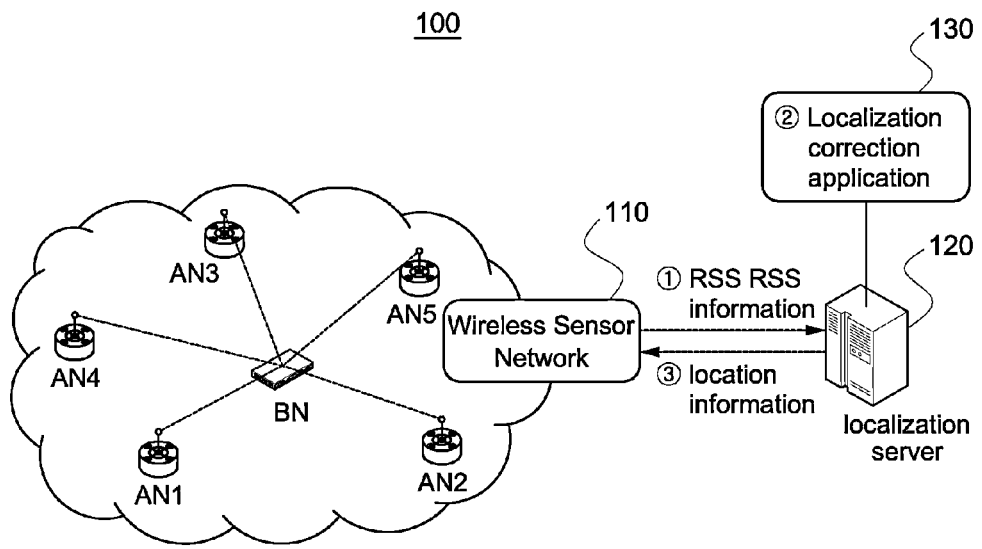
FIG. 4 is a schematic diagram showing a wireless localization system (100) for performing error-correction localization method according to the present invention.

According to this viewpoint, in order to offset the geometrical problems caused by the noisy range of location estimation, the present invention proposes a location estimation method having improved error correction (error-correction localization method). FIG. 4 is a schematic diagram showing a wireless localization system (100) for performing the error-correction localization method. The wireless localization system (100) includes at least three reference nodes (AN1, AN2, AN3) locations of which are known, a wireless network (110) having a terminal for localization location of which is to be found, that is, a blind node (BN), and a wireless network localization server (120) for executing a localization correction application (130), processing RSS information provided by the wireless network (110), calculating precisely the location information of the blind node (BN). The localization correction application (130) executed in the localization server (120) embodies 'error correction localization method' according to the present invention. This localization correction application (130) program is recorded in a computer readable recording medium such as CD, DVD, hard disc, nonvolatile memory, etc., and is connected to a computer device such as the localization server (120) and then executed.

Figure 5:
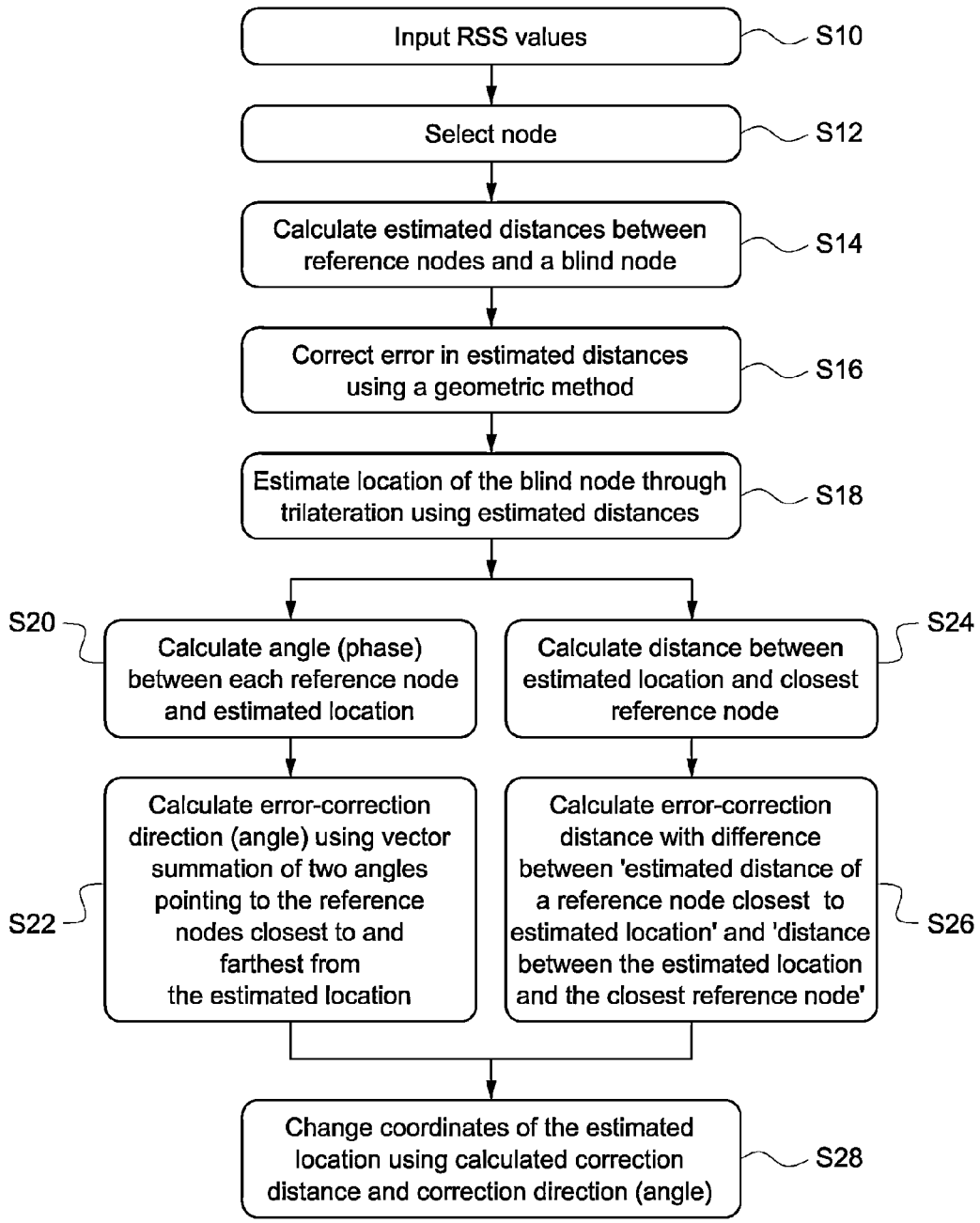
FIG. 5 is a flowchart for explaining error-correction localization method according to the present invention.

FIG. 5 is a flowchart for explaining error-correction localization method according to the present invention. The error correction localization method according to the present invention includes steps for calculating estimated distances, correcting geometrical errors, trilateration, calculating error-correction angles, and calculating error-correction distances. However, the step for correcting geometrical errors may be performed if necessary. The error-correction localization method described below is performed by the localization server (120) executing the localization correction application (130).

To be more specific, in the estimated distance calculating step, the localization server (120) is provided with RSS values from each reference node (AN1, AN2, AN3, ... ) of the wireless network (110) in order to estimate the location of the blind node (S10). Each RSS value is a value determined from the signal which each reference node (AN1, AN2, AN3, ... ) received from the blind node (BN). The localization server (120) with RSS value input selects a blind node (BN) and three or more reference nodes for location estimation of this blind node (BN) (S12). Usually, 3-5 nodes with best signal strength are used as reference nodes. Below is explained a case of selecting three reference nodes (AN1, AN2, and AN3) for an example. The localization server (120), after selecting the reference nodes, estimates distances from each of the three reference nodes (AN1, AN2, and AN3) to the blind node (BN) using RSS values (S14). Three estimated distances between each of the reference nodes (AN1, AN2, and AN3) and the blind node (BN) are obtained using Eq. (1-2) in the above. If the estimated distances from the blind node (BN) to the three reference nodes are obtained, then the location of the blind node (BN) is estimated through trilateration using the estimated distances (S18). That is, the location of the blind node (BN) can be estimated by obtaining the equation of circles according to the estimated distances.

However, prior to obtaining estimated location using trilateration, if there is a need to compensate errors of estimated distances obtained in the step S14, a process for correcting the error is performed. As explained before, the location localization approach using wireless sensor estimates distance using signal strength, and estimates the location by obtaining equation of circles. The distance estimation approach using RSS makes ten cases as in FIG. 6 in trilateration because it is hard to estimate precise distance due to shadowing by environment and reflected waves. For example, Case 1 produces an error lower than other cases. This can be anticipated from the CRLB described in the above (refer to FIG. 7). The CRLB is a value indicating minimum variance of a factor to be estimated using a probabilistic model (probabilistic model: minimum variance exponent of estimated distance d from the path-loss Eq. (1-2)), and can be obtained in the order of Eqs. (3)~(6). Based on CRLB values, the smaller the estimated distance is, the smaller the variance of the value of the estimated distance is. Thus, the smaller the estimated distance is, the more reliable the value of the estimated is (this is why to impart larger weight to reference node closest to the estimated location, which will be described later). The present invention performs error-correction using that.

The first of error correction is an error correction to the estimated distance value between each of reference nodes (AN1, AN2, and AN3) and the blind node (BN) (S16). The error correction to estimated distance can be performed by a geometric method. The geometric method offsets the localization error, when an estimated circle (Eq. (2)) of a reference node which is far away includes another estimated circle of different reference node, by correcting the estimated distance so as to have the largely-estimated circle touch the smallest circle. In other words, when an estimated distance circle (a circle with the estimated distance as radius) having the largest range among the estimated distance circles for each reference node includes an estimated distance circle of other reference node (that is, when the two estimated distance circles cannot make an intersecting point), the localization error is corrected by matching the estimated distance circle having the largest estimation range (that is, an estimated distance circle including other estimated distance circles) to the smallest estimated distance circle. This can be represented by an equation, Eq. (7) as follows.

$$\text{if } \hat{d}_i > \text{dist}_{i,j} + \hat{d}_j$$

$$\hat{d}_i = \text{dist}_{i,j} + \hat{d}_j$$

$$\text{end} \tag{7}$$

Here, $\hat{d}_i$ and $\hat{d}_j$ are estimated distances having node number i and j, $\text{dist}_{i,j}$ is a distance between reference nodes i and j. Index i is a number of reference node which is farthest away from the estimated location, and index j is a number of reference node which is closest from the estimated distance, such that the range appears smallest.

This geometric method can correct error very simply by considering the feature that when estimating without error in trilateration one estimated distance circle has at least one intersecting point with other estimated distance circle and correcting error by matching to the circle with least variance. Therefore, this geometric method can be applied to a case that a large circle includes other small circle as in Cases 3, 6, 7, 8, 9, and 10 of FIG. 6. In case that the calculated estimated distances with respect to the selected reference nodes form any one of circles corresponding to Cases 3, 6, 7, 8, 9, and 10 of FIG. 6, the error correction to the estimated distances can be performed by applying Eq. (7), and in the other cases the geometric method for error correction of Step 16 is not performed. The advantages of this geometric method are that the error correction using it is very simple while showing excellent performance (accuracy improvement).

If estimated distances applied with error correction or without a need for error correction are obtained through the above steps (S14, S16), then a step (S18) for estimating the location of the blind node (BN) is performed by applying the obtained estimated distances and the known coordinates of reference nodes to Eq. (2) and using trilateration described in the above.

Figure 8:
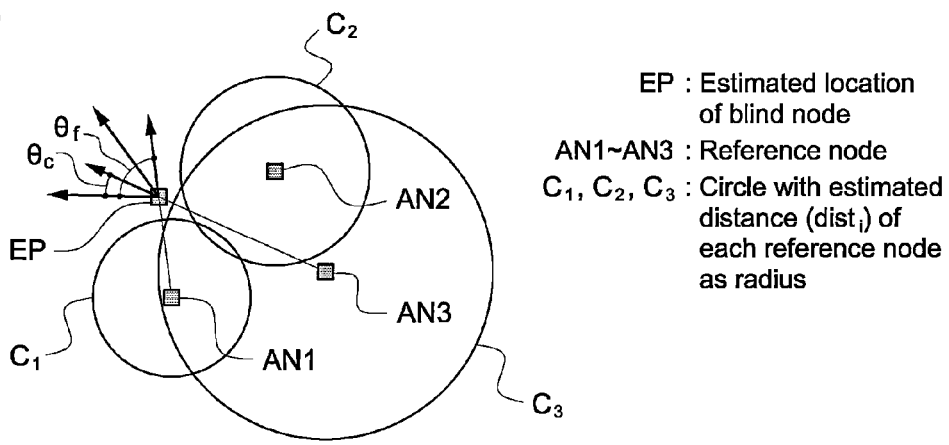
FIGS. 8(a) and 8(b) are diagrams showing how to calculate error-correction angle (direction) and error-correction distance respectively.
FIG. 8(c) is a diagram showing how to correct location estimated by trilateration by applying the calculated error-correction angle (direction) and error-correction distance.
Figure 8:
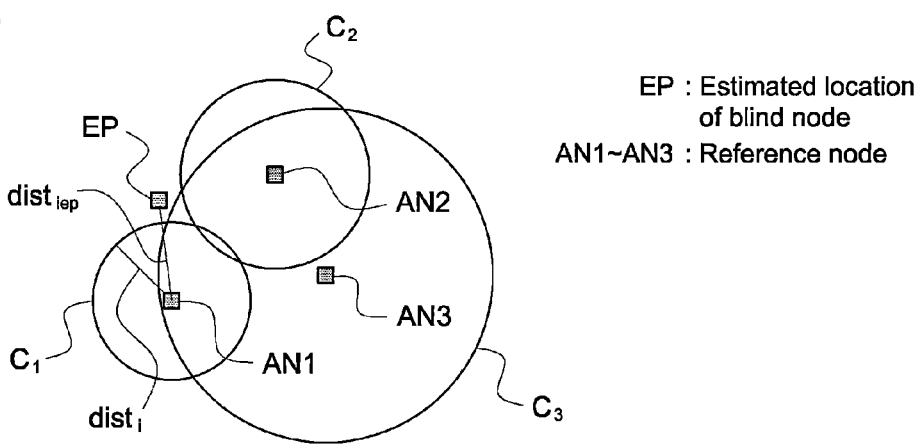
Figure 8:
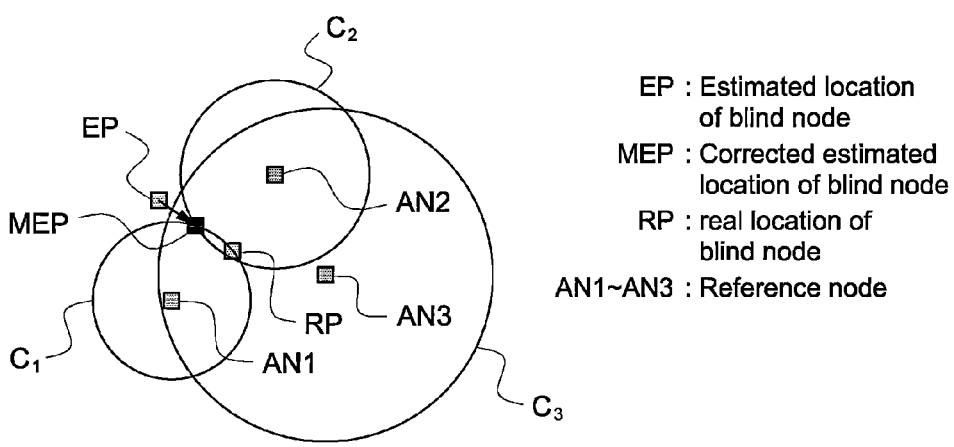

After the location estimation is obtained, using the location estimation, an error-correction amount in the estimated location is calculated. Correcting error in the estimated location is like to move the estimated location to a direction for minimizing the error by the distance necessary for error minimization. Therefore, the error-correction angle (direction) calculation (S20, S22) and the error-correction distance calculation (S24, S26) are performed. FIGS. 8(a) and 8(b) are diagrams showing how to calculate error-correction angle (direction) and error-correction distance respectively, and FIG. 8(c) is a diagram showing how to correct location estimated by trilateration by applying the calculated error-correction angle (direction) and error-correction distance. Referring to this, a method for correcting estimated location by calculating error-correction angle (direction) and error-correction distance is described below.

First of all, a method for determining error correction angle (direction) is explained. In order to obtain the error compensation direction, that is, error correction angle, a linear phase (an estimated angle) pointing from each reference node (AN1, AN2, An3) to an estimated location (EP) should be calculated using each reference node and the estimated point (S20). The following Eq. (8) is for this.

$$\text{Est}_A(\theta_i) = \tan^{-1}\left(\frac{y_i - y_e}{x_i - x_e}\right) \quad (8)$$

Here, $\text{Est}_A(\theta_i)$ is the estimated angle of reference node i.

The estimated location (EP) is moved (corrected) in order to give weights to 'a circle having as radius estimated distance of the reference node (AN1) with the reference node (AN1) as its center, respectively, which is closest from the estimated location (EP)' (shortest distance circle). Hence, a first angle vector $\tilde{\theta}_c$, that is, a first direction pointing to the closest reference node (AN1) from the estimated location (EP) and a second angle vector $\tilde{\theta}_f$, that is, a second direction pointing to the reference node (AN3) which is farthest away from the estimated location (EP) and thus makes the largest affects on determination of the estimated location should be obtained using Eq. (8) respectively. Then using Eq. (9), the error correction direction (angle) $\text{Comp}_A$ (used as cosine and sine functions indicating x and y directions) is obtained (S22).

$$\text{Comp}_A = \frac{\alpha \times \tilde{\theta}_f + \beta \times \tilde{\theta}_c}{|\alpha \times \tilde{\theta}_f + \beta \times \tilde{\theta}_c|} \quad (9)$$

Here, weights $\alpha$ and $\beta$ are values determined by Eq. (10) below respectively. $\text{dist}_c$ and $\text{dist}_f$ stand for estimated distances at reference nodes which are closest to and farthest from the estimated location respectively.

$$\alpha = \frac{\text{dist}_f}{\text{dist}_f + \text{dist}_e} \quad \beta = \frac{\text{dist}_c}{\text{dist}_f + \text{dist}_c}, \quad 0 \le \alpha, \beta \le 1 \quad (10)$$

According to the inventor's simulations, when setting $\alpha$ and $\beta$ to 1 respectively, that is, when calculating sum of vectors with respect to the first angle vector $\tilde{\theta}_c$ and the second angle vector $\tilde{\theta}_f$ with respect to the selected reference nodes AN1 and AN3 and then correcting in directions of the obtained angle vectors, the most excellent localization performance (accuracy) was obtained.

On the other hand, in order to calculate distance for error correction $\text{Comp}_D$, a distance $\text{dist}_{iep}$ from the estimated location obtained in Step S18 to the closest reference node is calculated (S24).

Then, a difference between a value obtained by applying a specific weight $\gamma$ to the 'estimated distance $\text{dist}_i$ of reference node closest to the estimated location' and 'estimated distance $\text{dist}_{iep}$ from the closest reference node to the estimated location' is calculated. The distance difference is the very error correction distance $\text{Comp}_D$ (S26). The following Eq. (11) is for that.

$$\text{Comp}_D = \gamma \times \text{dist}_i - \text{dist}_{iep}, -\text{CRLB}_i \le \gamma \le \text{CRLB}_i \quad (11)$$

Here, the weight $\gamma$ is a value determined by CRLB from the reference node closest to the estimated location.

According to the inventor's simulation, when the weight $\gamma$ is 1 the obtained error correction distance was determined to be most optimal.

Like this, since using only the estimated distances of reference nodes and/or the estimated location and information on distances to reference nodes in determining correction direction and correction distance for compensating error in the estimated location, the calculation is very simple and a fast calculation is possible.

Due to Eq. (6), the closest reference node has the most confident distance probabilistically according to CRLB. Therefore, in order to correct localization error, it is necessary to match (that is, move) the estimated location obtained by trilateration to the estimated distance circle of closest reference node. A disadvantage of this method is that it only depends on the accuracy of the estimated distance from the closest reference node. Accordingly, the accuracy (or performance) of this method is lessened in a high shadowing environment.

By moving the coordinates of the estimated location obtained in Step S18 using the error correction angle $\text{Comp}_A$ and error correction distance $\text{Comp}_D$ calculated through the above processes, the error in the estimated location can be compensated (S28). The error correction angle $\text{Comp}_A$ determines the direction of error correction, and $\text{Comp}_D$ determines length and sign (that is, plus or minus).

And the coordinates obtained by moving the estimated location of the blind node obtained by trilateration in Step S18 according to the error correction angle $\text{Comp}_A$ and error correction distance $\text{Comp}_D$ are determined to be the final estimated location of the blind node (S30).

If correcting the estimated location using the error correction angle $\text{Comp}_A$ and error correction distance $\text{Comp}_D$, more precise location can be estimated for other cases which is hard to correct with the geometric method.

In the above, a method for correcting localization error using three reference nodes has been described, but the number of reference nodes can be four or more. In such a case more than four estimated distances are obtained, and the estimated location of the blind node is calculated using the more than four estimated distances with multilateration.

Figure 9:
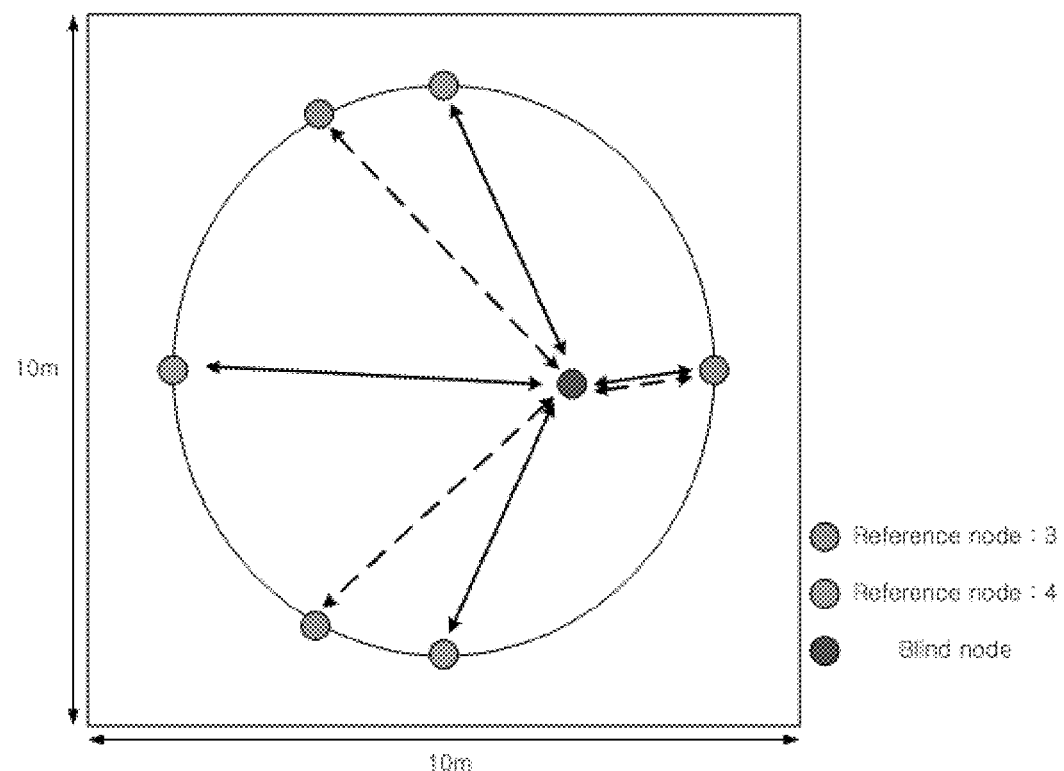
FIG. 9 is a diagram showing IEEE 802.15.4a indoor channel simulation model for measuring performance of the present invention.

The inventor has measured the performance of the present invention through a simulation following IEEE 802.15.4a indoor channel model as shown in FIG. 9. The simulation field is an office environment (10 m, 10 m), and the reference nodes are fixed and their locations are provided. The number of reference nodes may change with simulation scenario, and the reference nodes are placed uniformly in a circle with a radius of 3 m in order to ensure the same distance from the center of the simulation field.

IEEE 802.15.4a indoor channel model denotes the path-loss model, and its parameters such as path-loss exponent, shadowing factor (for example 2 to 4 dB), etc in the indoor office environment. The simulation shows the two factors, the number of reference nodes and the differences in the shadowing factor.

In an environment where the shadowing factor is 2 dB and the channel exponent value is 2.2001, according to average value obtained from 100,000 simulation trials, the present invention is ascertained to show an improvement of performance (localization accuracy) by 40-43% compared to the conventional LSE. Furthermore, it showed better performance than WLSE method which requires vast amount of calculations. Above all, even with the increased number of reference nodes, the LSE method or the WLSE method shows lower performance than the present invention, and the wireless localization method of the present invention has been ascertained to show higher performance than the LSE method or the WLSE method regardless of the number of reference nodes all the time.

The error correction method according to the present invention shows an excellent performance even in a case of estimating location through trilateration using three reference nodes. That is, even with minimum number of reference nodes, a good result can be obtained. Since the present invention calculates the error correction amount using estimated distance only, it is simple and can be performed in real-time. Therefore, it can be a practical method to be applied to location based services.

INDUSTRIAL APPLICABILITY

The present invention may be applied widely to fields requiring wireless localization using RSSI, especially to real-time wireless localization services.

What is claimed is:

1. A wireless localization method performed by a wireless localization server in a wireless network including at least three reference nodes locations of which are known, a blind node location of which is to be found, and the wireless localization server, the method comprising:
   a first step for, in the wireless localization server, being supplied with received signal strengths (RSS) of received wireless signal that are received from the at least three reference nodes and calculating at least three estimated distances from each of the at least three reference nodes to the blind node;
   a second step for, in the wireless localization server, calculating estimated location of the blind node with multilateration using the calculated at least three estimated distances;
   a third step for, in the wireless localization server, calculating error-correction direction and error-correction distance of the estimated location with a reference node closest to the estimated location as a center using the estimated distances calculated in the first step, in order to correct error in the calculated estimated location; and
   a fourth step for, in the wireless localization server, calculating a corrected estimated location with the estimated location of the blind node calculated in the second step moved in the error-correction direction and by the error-correction distance calculated in the third step.

2. The wireless localization method of claim 1, wherein the error-correction direction in the third step is calculated by performing the steps for:
   calculating a first angle vector $\tilde{\theta}_c$ pointing from the estimated location calculated in the second step to the closest reference node and a second angle vector $\tilde{\theta}_f$ pointing to the farthest reference node; and
   obtaining an error-correction direction (angle) $\text{Comp}_A$ using the following formula (where the weights $\alpha$ and $\beta$ are values determined by the following formula, and $\text{dist}_c$ and $\text{dist}_f$ stand for estimated distances from the closest reference node and the farthest reference node respectively), $$\text{Comp}_A = \frac{\alpha \times \tilde{\theta}_f + \beta \times \tilde{\theta}_c}{|\alpha \times \tilde{\theta}_f + \beta \times \tilde{\theta}_c|} \quad \alpha = \frac{\text{dist}_f}{\text{dist}_f + \text{dist}_c} \quad \beta = \frac{\text{dist}_c}{\text{dist}_f + \text{dist}_c},$$

$$0 \leq \alpha, \beta \leq 1.$$

3. The wireless localization method of claim 2, wherein the weights $\alpha$ and $\beta$ have value 1 respectively.

4. The wireless localization method of claim 1, wherein the error-correction distance in the third step is calculated by performing the steps for:
   calculating an estimated distance $\text{dist}_i$ of a reference node closest to the estimated location and a distance $\text{dist}_{iep}$ from the estimated location to the closest reference node; and
   calculating error-correction distance $\text{Comp}_D$ using the following formula (a weight $\gamma$ is a value determined by CRLB from a reference node closest to the estimated location, i specifies the reference nodes, and $\text{CRLB}_i$ is a minimum variance of the distance of the reference node (i) to estimate):

$\text{Comp}_D = \gamma \times \text{dist}_i - \text{dist}_{iep}, -\text{CRLB}_i \leq \gamma \leq \text{CRLB}_i.$ 5. The wireless localization method of claim 4, wherein the weight $\gamma$ is 1.

6. The wireless localization method of claim 1, wherein the second step comprises a step for calculating the estimated location of the blind node using trilateration using three estimated distances.

7. The wireless localization method of claim 1, further comprising, prior to the second step, a fifth step for, when there exists an error larger than a threshold in the at least three estimated distances calculated in the first step, performing error-correction with respect to the estimated distances containing the error.

8. The wireless localization method of claim 7, wherein the fifth step comprises the sub-steps for:
   obtaining at least three estimated distance circles with the at least three estimated distances, corresponding to the at least three reference nodes, as radii and with the at least three reference nodes as a center, respectively; and
   when the estimated distance circle with the largest range among the at least three estimated distance circles includes the other two estimated distance circles and cannot form a cross point with them, reducing the estimated distance of the estimated distance circle with the largest range for error-correction such that the estimated distance circle with the largest range touches the estimated distance circle with a smallest range.

9. A non-transitory computer readable recording medium storing a wireless localization program and that is readable by a wireless localization server in a wireless network including at least three reference nodes locations of which are known, a blind node location of which is to be found, and the wireless localization program comprising:
- a first function of, in the wireless localization server, being supplied with received signal strengths (RSS) of received wireless signal that are received from the at least three reference nodes and calculating at least three estimated distances from each of the at least three reference nodes to the blind node;
- a second function of, in the wireless localization server, calculating estimated location of the blind node with multilateration using the calculated at least three estimated distances;
- a third function of, in the wireless localization server, calculating error-correction direction and error-correction distance of the estimated location with a reference node closest to the estimated location as a center using the estimated distances calculated in the first function, in order to correct error in the calculated estimated location; and
- a fourth function of, in the wireless localization server, calculating a corrected estimated location with the estimated location of the blind node calculated in the second function moved in the error-correction direction and by the error-correction distance calculated in the third function.

10. The non-transitory computer readable recording medium of claim 9, wherein the error-correction direction is an error correction direction (angle) $Comp_A$ calculated using the following formula, where $\theta_c$ and $\theta_f$ are a first angle vector pointing to the closest reference node and a second angle vector pointing to the farthest reference node, the weights $\alpha$ and $\beta$ are values determined by the following formula, and $dist_c$ and $dist_f$ stand for estimated distances from the closest reference node and the farthest reference node respectively, $$Comp_A = \frac{\alpha \times \hat{\theta}_f + \beta \times \hat{\theta}_c}{|\alpha \times \hat{\theta}_f + \beta \times \hat{\theta}_c|} \quad \alpha = \frac{dist_f}{dist_f + dist_c} \quad \beta = \frac{dist_c}{dist_f + dist_c},$$

$$0 \leq \alpha, \beta \leq 1.$$

11. The non-transitory computer readable recording medium of claim 9, wherein the error-correction distance is an error-correction distance Compo obtained using the following formula, where $dist_i$ is an estimated distance of a reference node closest to the estimated location and $dist_{iep}$ is a distance from the estimated location to the closest reference node, a weight y is a value determined by CRLB from a reference node closest to the estimated location, i specifies the reference nodes, and $CRLB_i$ is a minimum variance of the distance of the reference node (i) to estimate, $$Comp_D = \gamma \times dist_i - dist_{iep}, -CRLB_i \leq \gamma \leq CRLB_i.$$

12. The non-transitory computer readable recording medium of claim 9, wherein the wireless localization program further comprises:
- a fifth-1 function for obtaining at least three estimated distance circles with the at least three estimated distances, corresponding to the at least three reference nodes, as radii and with the at least three reference nodes as a center, respectively; and
- a fifth-2 function for, when the estimated distance circle with the largest range among the at least three estimated distance circles includes the other two estimated distance circles and cannot form a cross point with them, reducing the estimated distance of the estimated distance circle with the largest range for error-correction such that the estimated distance circle with the largest range touches the estimated distance circle with a smallest range.

* * * * *